United States Patent

Mendes

[11] 4,350,553
[45] Sep. 21, 1982

[54] ACID BATH APPARATUS

[76] Inventor: Paul V. Mendes, 941 Tamarack, Sunnyvale, Calif. 94086

[21] Appl. No.: 287,424

[22] Filed: Jul. 27, 1981

[51] Int. Cl.³ .............................................. C23F 1/02
[52] U.S. Cl. .................................... 156/345; 156/627
[58] Field of Search ................ 156/345, 627, 637–639, 156/293; 134/57 R, 58 R, 102, 105, 107, 113; 422/292, 300

[56] References Cited
U.S. PATENT DOCUMENTS

| 2,416,716 | 3/1947 | Ross | 156/638 X |
| 3,411,999 | 11/1968 | Weinberg | 156/637 X |
| 3,799,179 | 3/1974 | Thomas | 156/345 X |

Primary Examiner—William A. Powell
Attorney, Agent, or Firm—Claude A. S. Hamrick

[57] ABSTRACT

Acid bath apparatus including a rectangular beaker (17) provided with a flange (40) and lip (42) which cooperate through a gasket (46), or other elastomeric device, with a circumscribing shelf (26) and an upstanding ridge (44) of a support housing (14) to create an effective seal (24) between the beaker and support housing (14). The shelf (26) is sloped away from the beaker (17) to carry away from the seal (24) any condensate that may form on it. The bath is heated by a heater (68) including electrical resistance elements (70) arranged on the beaker (17) and temperature is controlled by a temperature regulator (98) and an overtemperature sensing device (100) which deactivates the heater when an overtemperature condition is detected in the beaker (17).

9 Claims, 5 Drawing Figures

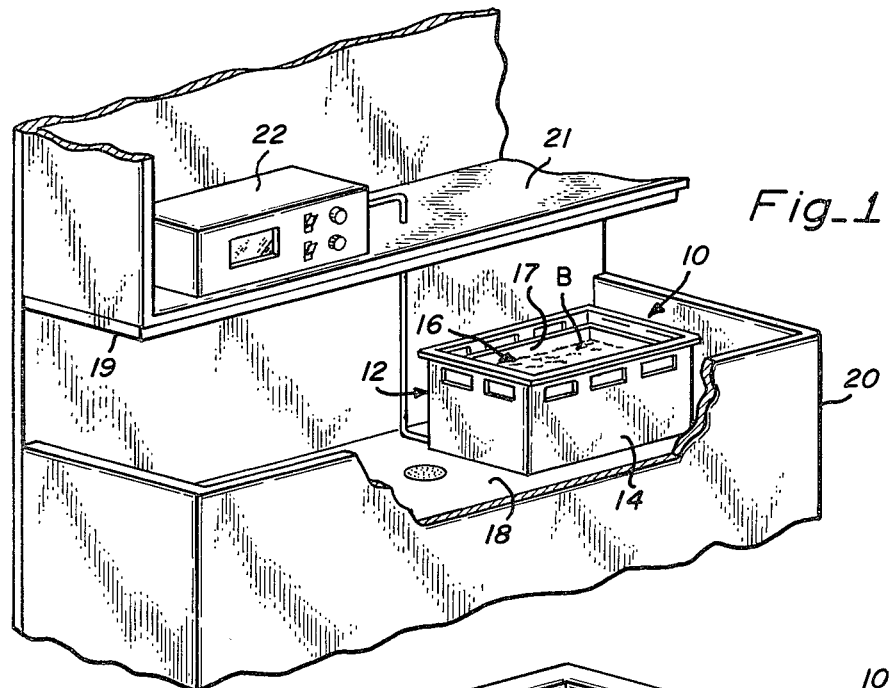
Fig_1
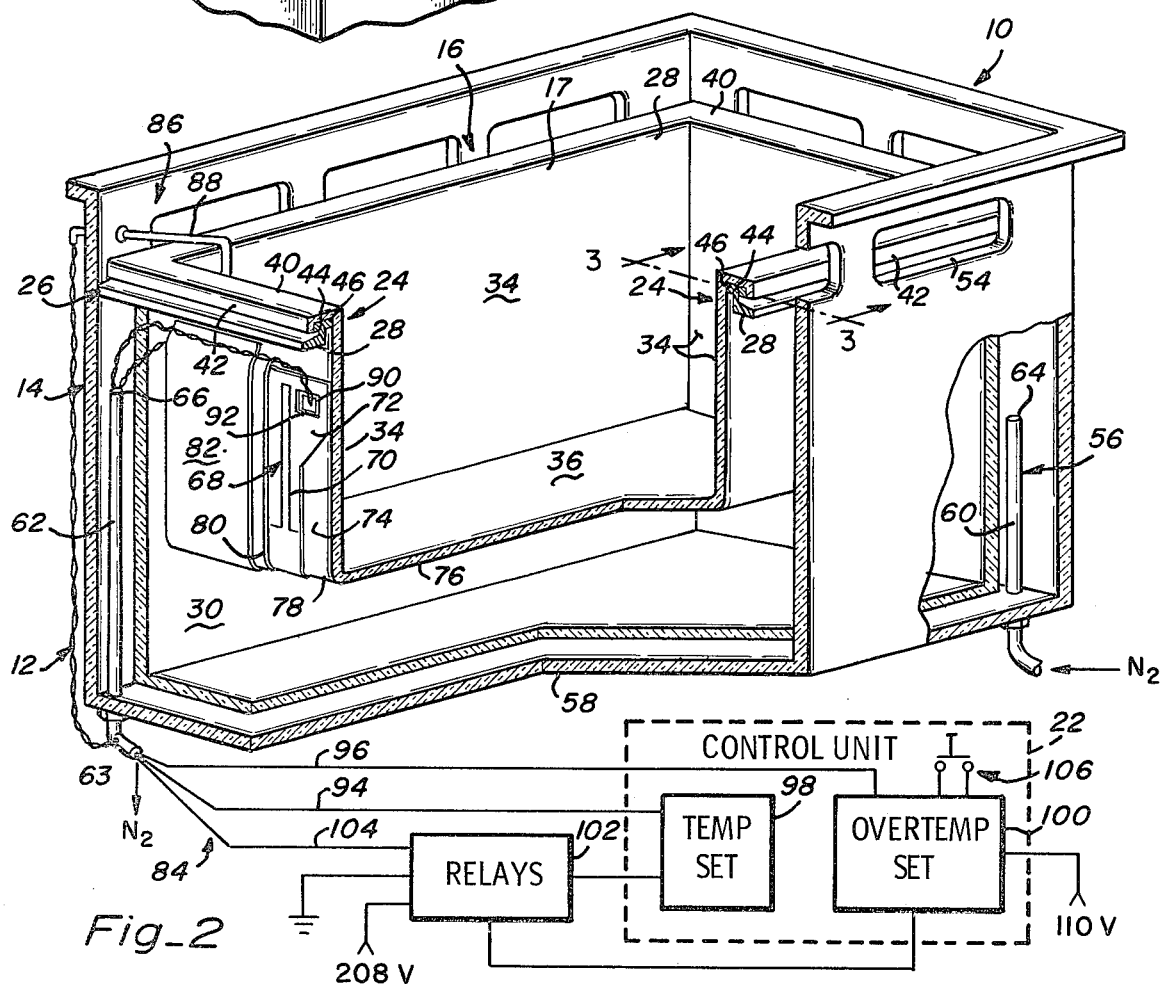
Fig_2

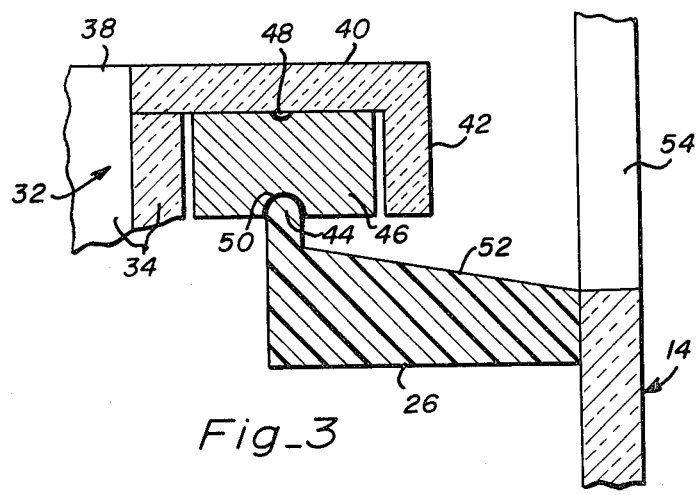
Fig_3
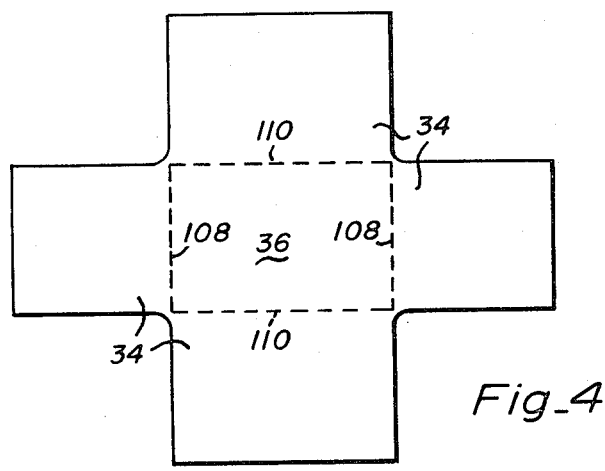
Fig_4
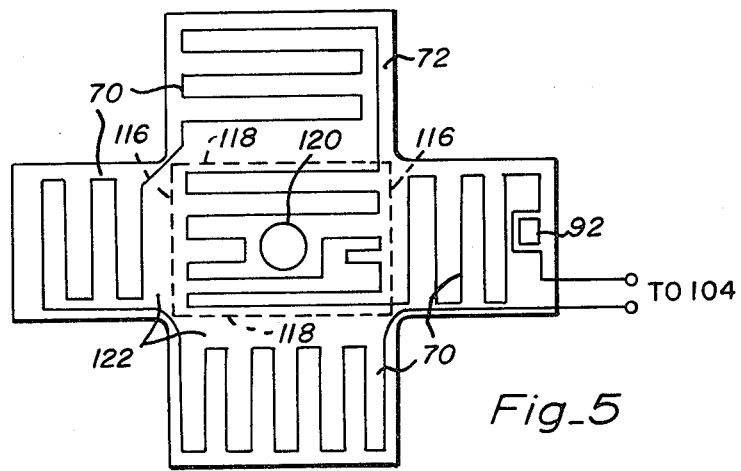
Fig_5

ACID BATH APPARATUS

BACKGROUND OF THE INVENTION

1. Field of the Invention

This invention relates generally to acid baths, and more particularly to high temperature acid baths as used for etching semiconductors and the like.

2. Description of the Prior Art

During the manufacture of integrated circuits and like semiconductor devices, it is generally necessary to place in a bath of a hot acid a usually rectangular rack known as a boat, holding one or more disks, called slices or wafers, of semiconductor material, usually pure silicon, on which a large number of integrated circuits have been formed by a known process using a material referred to as a "photoresist" in order to etch, or wash, away unwanted material on the disks. The disks subsequently are scored and broken into individual integrated circuit chips.

The container of the hot acid, which container is generally referred to as a beaker, is disposed over a sink or other drain, so to as much as possible prevent the acid, which is extremely toxic and highly volatile, from escaping the area of the bath. For this reason, it is imperative that a good seal be obtained between a peripheral portion of the open-top acid beaker and a structure supporting the beaker. Otherwise, acid and its fumes will collect beneath the beaker resulting in corrosive and possibly explosive conditions.

Although for safety reasons the acid bath usually is placed over some sort of drain, as opposed to what might be referred to as "free standing", this alone generally is not sufficient to remove the spilled acid and vapors rapidly enough. A principal difficulty arises in creating the aforementioned seal between an acid beaker or vessel and its support structure due to the fact that the vessel, which is generally constructed from either quartz or a borosilicate glass, is an open-topped device of rectangular configuration. While the rim area of round beakers constructed from quartz or glass can easily be molded into a configuration permitting a good seal with an associated support structure, it has been found to be very difficult to achieve a suitable seal with a rectangular beaker configuration. Round beaker, however, are not desirable for use in the semiconductor processing industries because such beakers waste much of the volume of the bath since the rectangular racks, or boats, will fit in only a small portion of the horizontal section of the beaker.

One prior art approach to achieving such a seal provided a horizontal flange on the upper rim of a vessel so as to be supported by a shelf forming part of the associated support structure. Inserted between the flange and the shelf was a room-temperature vulcanizing (RTV) elastomer for effecting the desired seal between the elements. A principal drawback encountered with this construction was that it permitted acid to collect immediately adjacent the seal, with the result that the acid eventually worked its way through the elastomer and permitted leakage by the seal, creating corrosive and possibly explosive conditions.

SUMMARY OF THE INVENTION

It is an object of the present invention to provide an acid bath apparatus which achieves a more effective seal between its acid vessel, or beaker, and the vessel support portion of the apparatus than has heretofore been realized with prior art devices.

It is another object of the present invention to provide a seal construction for an acid bath apparatus which will be more effective and longer lived than prior art seals intended for use with acid baths.

A still further object of the present invention is to provide an acid bath apparatus wherein acid condensate which collects on the support portion of the apparatus adjacent the seal is efficiently carried away from the seal.

Yet another object of the present invention is to provide an acid vessel, or beaker, constructed from a silica-based material in a rectangular configuration having a lip structure permitting an effective seal to be made between the beaker and an associated support arrangement.

These and other objects of the invention are achieved by providing an acid bath apparatus having a rectangular acid beaker formed with a flange and lip which cooperate, through an elastomer, with a shelf and upstanding ledge of an associated support to create an effective seal between the acid beaker and the support. The shelf advantageously is sloped away from the acid beaker to carry away from the seal any condensate that may form on the shelf adjacent the seal. The acid beaker is preferably fabricated from a silica-based material by the bottom and walls from a planar piece of the material and fusing the flange and lip pieces in place. The bath can be heated by a heater system including electrical resistance elements initially layed flat and then wrapped onto the acid beaker. Control of the heater system is accomplished by a unit including a temperature regulator and overtemperature device, the latter serving to deactivate the heater system when an overtemperature condition is detected in the acid beaker.

A principal advantage of the present invention is that the seal between the rim of the acid beaker is more effective, thus eliminating much corrosion and explosion danger from the vicinity of the bath.

Another advantage of the present invention is that it is easy to clean after use.

Still another advantage of the present invention is that all corrosible components are well isolated from corrosive fluids and gases used and/or developed during use of the device.

These and other objects and advantages of the present invention will no doubt become apparent to those skilled in the art after a reading of the following detailed description of the preferred embodiment illustrated in the several figures of the drawing.

IN THE DRAWING

FIG. 1 is a fragmentary, diagrammatic perspective view showing an acid bath apparatus according to the invention;

FIG. 2 is a perspective view, partly schematic and partly broken away and in section, showing in more detail the acid bath apparatus of FIG. 1;

FIG. 3 is a fragmentary, sectional view taken generally along the line 3—3 of FIG. 2, but drawn to a larger scale;

FIG. 4 is a diagrammatic plan view showing a blank used for constructing a beaker according to the present invention; and FIG. 5 is a diagrammatic plan view similar to FIG. 4, but showing a heater unit according to the invention prior to being wrapped in place on an acid vessel, or beaker, according to the invention.

DETAILED DESCRIPTION OF THE PREFERRED EMBODIMENTS

Referring now more particularly to FIG. 1 of the drawing, an acid bath apparatus 10 according to the present invention comprises an outer housing and support portion 12 including an enclosure 14 within which is disposed a beaker assembly 16 including a beaker 17 according to the invention. Apparatus 10 is illustrated as being supported in a suitable manner within a sink 18 of a conventional wet processing station 20, although it is to be understood that apparatus 10 can alternatively be used independently of a station 20 in what is referred to as free standing mode if so desired. Station 20 is of a type well known and commercially available, and will not be described in detail herein except to mention that it usually is provided with a ventilating hood 19 and an instrument support cabinet or shelf 21.

Disposed remotely from enclosure 14, but forming a part of apparatus 10, is a control unit 22 which monitors and regulates the temperature of an acid bath B contained within the beaker assembly 16.

As shown in FIGS. 2 and 3, a seal system 24 according to the invention is associated with support portion 12 and beaker assembly 16 for making a fluid tight seal between the beaker 17 of assembly 16 and the support housing 12. The latter includes a rectangular frame 26 which is a part of enclosure 14 and forms a shelf 28 disposed above and partially defining a chamber 30 opening upwardly in enclosure 14. Specifically, shelf 28 forms an upper perimeter of chamber 30, while functioning to support the beaker 17 when it is mounted upon housing 12 and disposed to extend into chamber 30. When so positioned it causes chamber 30 to be fully enclosed. The beaker 17 is generally rectangular in configuration and has four sides 34, a bottom 36, and an open top 38. As more clearly shown in FIG. 3, top 38 is bordered by a flange 40, generally rectangular in plan, extending away from the sides 34.

A continuous lip 42 terminates flange 40 and extends downwardly from flange 40 toward the bottom 36. A rectangular, upstanding ridge 44 is provided on shelf 24 of frame 26 and extends upwardly toward flange 40 between the lip 42 of flange 40 and the sides 34 of beaker 17. A resilient sealing strip 46 is disposed between the side wall 34, flange 40 and lip 42 for sealingly engaging the ridge 44 and blocking any fluid flow between the lip 42 and ridge 44. Thus, the lip 42, ridge 44, and resilient element 46 cooperate to form a seal system 24 in accordance with the invention.

Prior to assembly of the sealing system, beads 48 and 50 of a suitable silicon adhesive, and the like, are placed along the opposed surfaces of sealing strip 46 where it contacts the underside of flange 40 and the upper part of ridge 44, respectively, in order to affix the strip to flange 40 and ledge 44 and assure that it remains in proper position. In the preferred embodiment strip 46 is a highly inert gasket made of a material marketed under the name "VYTON". However, any suitable room temperature vulcanizing elastomeric sealing material may be used.

As depicted in FIG. 3, the shelf 28 is configured to have an upper surface 52 which slopes away, or downwardly, from seal 24 for draining any acid which is splashed upon or any acid vapor which condenses upon shelf 28 away from the seal 24 and through the openings 54 into the sink.

In order to further militate against any possibility of acid or vapor intrusion into chamber 30, the chamber is pressurized with nitrogen gas $N_2$. More specifically, a pair of standpipes 60 and 62 are sealingly mounted to apertures in the floor 58 at opposite corners of enclosure 14. Pipe 60 is connected to a source of gas under pressure, and pipe 62 serves to vent the gas to atmosphere. The lengths of pipes 60 and 62 are selected such that the upper ends 64 and 66 extend above the floor 58 a distance sufficient to place the openings thereof above the level that liquid would rise in chamber 30 if the contents of the beaker 17 were to leak into chamber 30, such as would be the case if beaker 17 should break. Although any suitable purging gas can be used in chamber 30, nitrogen is preferred.

The beaker assembly 16 further includes a heater system 68 comprising substantially planar heater elements 70 in the form of electrical resistance elements wound from a ribbon wire, or the like, affixed to a suitable insulating paper 72. The heating system is affixed to the bottom 36 and sides 34 of beaker 17 on surfaces 74 and 76, respectively, with the heating elements facing the beaker 32. Heater elements 70 are not provided in corners 78 of beaker 17 since these corners are formed by bending and consequently, have internal stresses therein which should not be subjected to direct application of heat. A thermal insulating blanket 80 of a conventional material covers the heater system 68 so that substantially all of the heat from the heater elements 70 is directed inwardly toward the beaker 32. An assembly wrapper 82 covers the entire heater system 68.

Power to heater elements 70 is supplied and monitored by a temperature control system 86 which includes a first thermocouple 88 in the form of a probe extending through the enclosure at a point above the shelf 28 and into the beaker 17 for sensing the temperature of the liquid bath. A second thermocouple 90 is adhered directly to a surface of one of the sides of the beaker 17 for detecting the presence of a preset overheat temperature in beaker 17. A hole 92 is provided in the heater paper 72 and insulating blanket 80, as well as wrapper 82, to permit attachment of thermocouple 90 to beaker 17.

A pair of wires 94 and 96 pass through a tube 63 connected to pipe 62, which functions as a routing tube for these wires as well as the lead lines for thermocouples 88 and 90, respective, between unit 12 and control unit 22. Pipe 62 and tube 63 also serve as a venting passageway for the purging gas pumped into the enclosure 14. Control unit 22 includes a temperature set control unit 98 and an overtemperature set control unit 100 which are connected to thermocouples 88 and 90, respectively, by wires 94 and 96. Units 98 and 100 are of conventional construction; it having been found satisfactory to use a "WATLOW Series 808" for unit 98, and a "WATLOW Series 340" for unit 100, both of these controllers being manufactured by Watlow Winona, Inc., of Winona, Minnesota. Units 98 and 100 are connected to an arrangement of relays 102 of conventional construction, which are in turn connected to heater elements 70 via an electrical line 104. Relays 102 also are connected to a conventional source of electrical energy, preferably 208 volts, which is selectively connected and disconnected to line 104 by action of relays 102 under control of units 98 and 100.

More specifically, unit 98 is set at a predetermined desired temperature for bath B, say 100° C., and causes heater system 68 to put out sufficient heat to normally maintain the acid bath B at this temperature. If the level of liquid in beaker 17 falls below a certain level due to excessive vaporization or leakage therefrom, the temperature of the sides 34 of beaker 17 will rise accordingly, say to a temperature of 115° C., causing unit 100 to deactivate heater system entirely until same is reset by a reset switch 106 disposed on the control unit 22 (see FIG. 1). Unit 100 receives its required power from a conventional 110 volt source. The overtemperature safety feature is particularly advantageous in the event beaker 17 should crack or break.

Beaker 17 is normally constructed from a planar sheet of quartz or a borosilicate glass, or the like, by cutting same to the shape of a cross having a rectangular central portion and four rectangular outside portions to form bottom 36 and sides 34 of a beaker. This blank is shown in FIG. 4. Now, the sides 34 can be bent perpendicular to the plane of bottom 36 generally along bend lines 108 and 110 by known techniques, and adjacent ones of sides 34 are welded along the resulting seams 112 (FIG. 2).

Further rectangular pieces are then welded in place, again by known techniques, at the rim of the thus formed beaker to create the flange 40 and lip 42 which circumscribe the upper rim of beaker 17.

FIG. 5 schematically shows how the heater system 68 can be laid out in a blank 114 and the ribbon forming heater elements 70 attached to the paper blank, as illustrated, prior to folding along lines 116 and 118 and attachment of the assembly onto the outer surfaces of the beaker 17. Conventional adhesives can be used to attach the heater elements as well as the overlying blanket of insulation and the outer wrapper. The specific arrangement of heater windings shown is intended to create convection currents in the bath B, thus making the use of conventional magnetic stirrers (not shown) and the like unnecessary; however, a hole 120 is provided in the central portion of blank 114 to permit use of such devices if desired. It will be understood that holes matching hole 120 must be provided in blanket 80 and wrapper 82 as well. It is important that the ribbon forming heater elements 70 not extend into the zones designated 122 on blank 114 so as to prevent the direct application of heat to the bent edges of beaker 32, as these edges contain stresses which can break under direct application of heat.

As can be readily understood from the above description and from the drawings, apparatus according to the present invention permits the use of an acid bath in a safe and efficient manner without the need for stirring devices, while minimizing the risk of corrosion and explosion from the acid bath.

Although the present invention has been described above in terms of presently preferred embodiments, it is to be understood that such disclosure is by way of example only and is not intended to be considered as limiting. Accordingly, it is intended that the appended claims are to be interpreted as covering all alterations and modifications as fall within the true spirit and scope of the invention.

What is claimed is:

1. An acid bath apparatus comprising, in combination:
   (a) housing means forming a first container having an open top, the opening being rectangular in configuration and defined by the inside edges of a circumscribing upwardly facing surface;
   (b) resilient seal means disposed upon said upwardly facing surface; and
   (c) beaker means forming a rectangular second container having a rectangularly configured open top, the opening being defined by an outwardly and downwardly turned lip, said beaker means being disposed within said first container with said lip extending over said surface and engaging said seal means, said beaker means being supported by said seal means and said surface, said seal means forming an airtight seal at the top of a chamber defined by the inside surface of said housing means and the outside surface of said beaker means.

2. An acid bath apparatus as defined in claim 1 wherein said upwardly facing surface slopes downwardly away from said inside edges for draining liquids away from said seal.

3. An acid bath apparatus as defined in claim 2 wherein said upwardly facing surface includes an upstanding ridge for engaging the bottom of said seal means.

4. An acid bath apparatus as defined in claim 1 or 3 wherein said resilient seal means is a continuous gasket constructed from an elastomeric material.

5. An acid bath apparatus as defined in claim 4 wherein the said resilient seal means is formed of a room temperature vulcanizing elastomer.

6. An acid bath apparatus as defined in claim 1 or 3 and further comprising first and second tube means extending through said housing means and into said chamber, said first tube means being connectible to a source of gas under pressure pressurizing said chamber and said second tube means providing a means for venting the gas under pressure from said chamber, the distal ends of said tube means being disposed above the floor of said chamber a distance sufficient to place the openings in said distal ends above the level to which liquid contained within said beaker means will rise in said chamber if the contents of said beaker should leak into said chamber.

7. An acid bath apparatus as defined in claim 6 and further comprising heater means disposed within said chamber and adhered to the bottom and sides of said beaker means, power supply means connected to said heater means for energizing same, and thermal insulating means covering said heater means for directing substantially all of the heat generated thereby inwardly toward said beaker means.

8. An acid bath apparatus as defined in claim 7 wherein said heater means is comprised of a continuous electrical resistance element, and electrical power is supplied thereto from a power supply means through conductors passing into said chamber through said second tube means.

9. An acid bath apparatus as defined in claim 8 wherein said power supply means further includes temperature control means comprising a first thermocouple means disposed to extend into said beaker means for sensing the temperature of acid contained therein, a second thermocouple means adhered to the surface of one of the sides of said beaker means for detecting the presence of a predetermined overheat temperature in said beaker means and regulator means connected to said first thermocouple means, said second thermocouple means and said heater means for controlling the application of power to said heater means as a function of a signal from said first thermocouple means and for discontinuing the application of power to said heater means when said second thermocouple means detects an overheat condition in said beaker means.

* * * * *